United States Patent
Cui et al.

(10) Patent No.: US 11,492,887 B2
(45) Date of Patent: *Nov. 8, 2022

(54) POWER SUPPLY SEMI-TRAILER FOR ELECTRIC DRIVE FRACTURING EQUIPMENT

(71) Applicant: Yantai Jereh Petroleum Equipment & Technologies Co., Ltd., Yantai (CN)

(72) Inventors: Shuzhen Cui, Yantai (CN); Rikui Zhang, Yantai (CN); Dong Liu, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,316

(22) Filed: Apr. 28, 2021

(65) Prior Publication Data

US 2021/0246774 A1    Aug. 12, 2021

Related U.S. Application Data

(63) Continuation of application No. 16/834,446, filed on Mar. 30, 2020, now Pat. No. 11,035,214.

(30) Foreign Application Priority Data

Jun. 13, 2019  (CN) .......................... 201910510411.8

(51) Int. Cl.
*E21B 43/26*        (2006.01)
*F04B 17/03*        (2006.01)
(Continued)

(52) U.S. Cl.
CPC .......... *E21B 43/2607* (2020.05); *F04B 17/03* (2013.01); *H02K 7/1823* (2013.01); *H02K 11/04* (2013.01); *H02K 11/046* (2013.01)

(58) Field of Classification Search
CPC .......................... E21B 43/2607; H02K 7/1823
See application file for complete search history.

(56) References Cited

U.S. PATENT DOCUMENTS 1,711,979 A    5/1929  Weinert
2,015,745 A   10/1935  Deri
(Continued)

FOREIGN PATENT DOCUMENTS

CN    101636901 A    1/2010
CN    101639040 A    2/2010
(Continued)

OTHER PUBLICATIONS

International Preliminary Report on Patentability Chapter I for PCT Application No. PCT/CN2019/102811 dated Dec. 23, 2021.

(Continued)

*Primary Examiner* — Pedro J Cuevas

(57) ABSTRACT

The present invention discloses a power supply semi-trailer for electric drive fracturing equipment, including a combination of a gas turbine engine, a generator and a rectifying unit, the generator outputs a winding configuration and a voltage required for the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure, occupies a small area, and is simple in wiring.

20 Claims, 2 Drawing Sheets

(51) Int. Cl.
　　　H02K 7/18　　　(2006.01)
　　　H02K 11/04　　(2016.01)

(56) References Cited

U.S. PATENT DOCUMENTS

| | | | |
|---|---|---|---|
| 3,035,222 A | 5/1962 | Stone |
| 3,378,755 A | 4/1968 | Sawyer |
| 3,453,443 A | 7/1969 | Stoeckly |
| 3,794,377 A | 2/1974 | Wachsmuth et al. |
| 3,815,965 A | 6/1974 | Ostwald |
| 4,136,432 A | 1/1979 | Melley, Jr. |
| 4,201,523 A | 5/1980 | Olofsson |
| 4,336,485 A | 6/1982 | Stroud |
| 4,720,645 A | 1/1988 | Stroud |
| 4,793,775 A | 12/1988 | Peruzzi |
| 4,904,841 A | 2/1990 | English |
| 4,992,669 A | 2/1991 | Parmley |
| 5,274,322 A | 12/1993 | Hayashi et al. |
| 5,517,822 A | 5/1996 | Haws et al. |
| 5,614,799 A | 3/1997 | Anderson et al. |
| 5,691,590 A | 11/1997 | Kawai et al. |
| 5,714,821 A | 2/1998 | Dittman |
| 5,751,150 A | 5/1998 | Rippel et al. |
| 5,821,660 A | 10/1998 | Anderson |
| 5,846,056 A | 12/1998 | Dhindsa et al. |
| 5,994,802 A | 11/1999 | Shichijyo et al. |
| 6,121,707 A | 9/2000 | Bell et al. |
| 6,134,878 A | 10/2000 | Amako et al. |
| 6,281,610 B1 | 8/2001 | Kliman et al. |
| 6,331,760 B1 | 12/2001 | McLane, Jr. |
| 6,388,869 B1 | 5/2002 | Fauteux et al. |
| 6,417,592 B2 | 7/2002 | Nakamura et al. |
| 6,450,133 B1 | 9/2002 | Bernard et al. |
| 6,455,974 B1 | 9/2002 | Fogarty |
| 6,552,463 B2 | 4/2003 | Oohashi et al. |
| 6,704,993 B2 | 3/2004 | Fogarty |
| 6,765,304 B2 | 7/2004 | Baten et al. |
| 6,784,583 B2 | 8/2004 | Umeda |
| 6,786,051 B2 | 9/2004 | Kristich et al. |
| 6,893,487 B2 | 5/2005 | Alger et al. |
| 6,895,903 B2 | 5/2005 | Campion |
| 7,007,966 B2 | 3/2006 | Campion |
| 7,016,207 B2 | 3/2006 | Yamanaka et al. |
| 7,075,206 B1 | 7/2006 | Chen |
| 7,081,682 B2 | 7/2006 | Campion |
| 7,112,891 B2 | 9/2006 | Johnson et al. |
| 7,122,913 B2 | 10/2006 | Witten et al. |
| 7,221,061 B2 | 5/2007 | Alger et al. |
| 7,245,032 B2 | 7/2007 | Willets et al. |
| 7,291,954 B2 | 11/2007 | Kashihara et al. |
| 7,372,174 B2 | 5/2008 | Jones et al. |
| 7,511,385 B2 | 3/2009 | Jones et al. |
| 7,608,934 B1 | 10/2009 | Hunter |
| 7,615,877 B2 | 11/2009 | Willets et al. |
| 7,619,319 B1 | 11/2009 | Hunter |
| 7,635,926 B2 | 12/2009 | Willets et al. |
| 7,656,052 B2 | 2/2010 | Jones et al. |
| 7,667,342 B2 | 2/2010 | Matsumoto et al. |
| 7,692,321 B2 | 4/2010 | Jones et al. |
| 7,755,209 B2 | 7/2010 | Jones et al. |
| 7,921,914 B2 | 4/2011 | Bruins et al. |
| 8,159,082 B2 | 4/2012 | Gemin et al. |
| 8,294,285 B2 | 10/2012 | Hunter |
| 8,294,286 B2 | 10/2012 | Hunter |
| 8,362,638 B2 | 1/2013 | Gemin et al. |
| 8,495,869 B2 | 7/2013 | Beissler et al. |
| 8,519,591 B2 | 8/2013 | Nishimura |
| 8,587,136 B2 | 11/2013 | Williams |
| 8,670,260 B2 | 3/2014 | Wang et al. |
| 8,773,876 B2 | 7/2014 | Kuboyama et al. |
| 8,789,601 B2 | 7/2014 | Broussard et al. |
| 8,796,899 B2 | 8/2014 | Imazawa et al. |
| 8,811,048 B2 | 8/2014 | Zhang et al. |
| 9,103,193 B2 | 8/2015 | Coli et al. |
| 9,140,110 B2 | 9/2015 | Coli et al. |
| 9,166,495 B2 | 10/2015 | Guan |
| 9,209,704 B2 | 12/2015 | Huang |
| 9,534,473 B2 | 1/2017 | Morris et al. |
| 9,562,420 B2 | 2/2017 | Morris et al. |
| 9,577,545 B2 | 2/2017 | Tan et al. |
| 9,641,112 B2 | 5/2017 | Harknett et al. |
| 10,184,397 B2 | 1/2019 | Austin et al. |
| 10,411,635 B2 | 9/2019 | Takahashi |
| 10,523,130 B2 | 12/2019 | Bax et al. |
| 10,584,671 B2 | 3/2020 | Tunzini et al. |
| 10,855,142 B2 * | 12/2020 | Cory ................. H02K 7/1823 |
| 11,035,214 B2 | 6/2021 | Cui et al. |
| 11,109,508 B1 | 8/2021 | Yeung et al. |
| 11,125,066 B1 | 9/2021 | Yeung et al. |
| 11,220,895 B1 | 1/2022 | Yeung et al. |
| 11,378,008 B2 | 7/2022 | Yeung et al. |
| 11,391,136 B2 | 7/2022 | Coli et al. |
| 2003/0030246 A1 | 2/2003 | Campion |
| 2003/0033994 A1 | 2/2003 | Campion |
| 2003/0057704 A1 | 3/2003 | Baten et al. |
| 2003/0064858 A1 | 4/2003 | Saeki et al. |
| 2003/0079479 A1 | 5/2003 | Kristich et al. |
| 2004/0081561 A1 | 4/2004 | Iwanami et al. |
| 2004/0104577 A1 | 6/2004 | Alger et al. |
| 2004/0174723 A1 | 9/2004 | Yamanaka et al. |
| 2005/0093496 A1 | 5/2005 | Tokunou et al. |
| 2006/0066105 A1 | 3/2006 | Johnson et al. |
| 2006/0066108 A1 | 3/2006 | Willets et al. |
| 2006/0080971 A1 | 4/2006 | Smith et al. |
| 2006/0208594 A1 | 9/2006 | Kashihara et al. |
| 2006/0260331 A1 | 11/2006 | Andreychuk |
| 2007/0108771 A1 | 5/2007 | Jones et al. |
| 2007/0121354 A1 | 5/2007 | Jones et al. |
| 2007/0216452 A1 | 9/2007 | Matsumoto et al. |
| 2009/0146426 A1 | 6/2009 | Jones et al. |
| 2009/0146500 A1 | 6/2009 | Jones et al. |
| 2009/0147549 A1 | 6/2009 | Jones et al. |
| 2009/0308602 A1 | 12/2009 | Bruins et al. |
| 2010/0060076 A1 | 3/2010 | Gemin et al. |
| 2010/0084922 A1 | 4/2010 | Gollentz et al. |
| 2010/0135840 A1 | 6/2010 | Fujimoto et al. |
| 2012/0002454 A1 | 1/2012 | Kuboyama et al. |
| 2012/0065787 A1 | 3/2012 | Broniak et al. |
| 2012/0175947 A1 | 7/2012 | Gemin et al. |
| 2012/0248922 A1 | 10/2012 | Imazawa et al. |
| 2012/0255734 A1 | 10/2012 | Coli et al. |
| 2013/0063070 A1 | 3/2013 | Zhang et al. |
| 2013/0182468 A1 | 7/2013 | Guan |
| 2013/0229836 A1 | 9/2013 | Wang et al. |
| 2013/0234522 A1 | 9/2013 | Tan et al. |
| 2014/0096974 A1 | 4/2014 | Coli et al. |
| 2014/0138079 A1 | 5/2014 | Broussard et al. |
| 2014/0174717 A1 | 6/2014 | Broussard et al. |
| 2014/0210213 A1 | 7/2014 | Campion et al. |
| 2014/0219824 A1 | 8/2014 | Burnette |
| 2014/0312823 A1 | 10/2014 | Huang |
| 2015/0027712 A1 | 1/2015 | Vicknair et al. |
| 2015/0068754 A1 | 3/2015 | Coli et al. |
| 2015/0252661 A1 | 9/2015 | Glass |
| 2015/0300145 A1 | 10/2015 | Coli et al. |
| 2015/0314255 A1 | 11/2015 | Coli et al. |
| 2016/0075387 A1 | 3/2016 | Fong et al. |
| 2016/0105022 A1 | 4/2016 | Oehring et al. |
| 2016/0177675 A1 | 6/2016 | Morris et al. |
| 2016/0177678 A1 | 6/2016 | Morris et al. |
| 2016/0369609 A1 | 12/2016 | Morris et al. |
| 2017/0104389 A1 | 4/2017 | Morris et al. |
| 2017/0154387 A1 | 6/2017 | Somers |
| 2017/0285062 A1 | 10/2017 | Kim |
| 2017/0302135 A1 * | 10/2017 | Cory ................. E21B 43/267 |
| 2017/0305284 A1 | 10/2017 | Koh et al. |
| 2018/0059754 A1 | 3/2018 | Shaikh et al. |
| 2018/0080376 A1 | 3/2018 | Austin et al. |
| 2018/0080377 A1 | 3/2018 | Austin et al. |
| 2018/0156210 A1 | 6/2018 | Oehring et al. |
| 2018/0328157 A1 | 11/2018 | Bishop |
| 2019/0100989 A1 | 4/2019 | Stewart et al. |
| 2019/0128265 A1 | 5/2019 | Washio et al. |
| 2019/0157982 A1 | 5/2019 | Brueckner et al. |

(56) References Cited

U.S. PATENT DOCUMENTS

| | | |
|---|---|---|
| 2019/0229643 A1 | 7/2019 | Bax et al. |
| 2019/0319459 A1 | 10/2019 | Brathwaite et al. |
| 2019/0331080 A1 | 10/2019 | Tunzini et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0109617 A1 | 4/2020 | Oehring et al. |
| 2020/0325760 A1 | 10/2020 | Markham |
| 2021/0040830 A1 | 2/2021 | Mu et al. |
| 2021/0095648 A1 | 4/2021 | Buckley et al. |
| 2021/0102530 A1 | 4/2021 | Pruitt et al. |
| 2021/0107616 A1 | 4/2021 | Pedersen |
| 2021/0199161 A1 | 7/2021 | Eto et al. |

FOREIGN PATENT DOCUMENTS

| | | |
|---|---|---|
| CN | 101728860 A | 6/2010 |
| CN | 102574475 A | 7/2012 |
| CN | 102810909 A | 12/2012 |
| CN | 103310963 A | 9/2013 |
| CN | 104578389 A | 4/2015 |
| CN | 204386465 A | 6/2015 |
| CN | 105763337 A | 7/2016 |
| CN | 106711990 A | 5/2017 |
| CN | 107231000 A | 10/2017 |
| CN | 107240915 A | 10/2017 |
| CN | 207652040 U | 7/2018 |
| CN | 108900136 A | 11/2018 |
| CN | 110118127 A | 8/2019 |
| CN | 110821464 A | 2/2020 |
| CN | 111181159 A | 5/2020 |
| CN | 210780534 U | 6/2020 |
| CN | 111628519 A | 9/2020 |
| CN | 111769551 A | 10/2020 |
| CN | 212671744 A | 3/2021 |
| CN | 213027453 U | 4/2021 |
| CN | 112993965 A | 6/2021 |
| CN | 113006757 A | 6/2021 |

OTHER PUBLICATIONS

International Search Report and Written Opinion of the International Searching Authority in PCT/CN2019/102811, dated Mar. 19, 2020, 10 pages.

Search Report for Chinese Application No. 202110455679.3 dated May 28, 2022.

Written Opinion and International Search Report for PCT Application No. PCT/CN2022/076452 dated Jun. 1, 2022.

Non-Final Office Action for U.S. Appl. No. 17/728,667 dated Sep. 16, 2022.

Non-Final Office Action for U.S. Appl. No. 17/733,922 dated Sep. 21, 2022.

\* cited by examiner

POWER SUPPLY SEMI-TRAILER FOR ELECTRIC DRIVE FRACTURING EQUIPMENT

CROSS-REFERENCE TO RELATED APPLICATIONS

The present application is a continuation of U.S. application Ser. No. 16/834,446, filed Mar. 30, 2020, which claims priority to CN 201910510411.8, filed Jun. 13, 2019, the entire contents of each are incorporated herein by reference.

TECHNICAL FIELD

The present invention relates to the technical field of oil-gas exploitation, and specifically to a power supply semi-trailer for electric drive fracturing equipment.

BACKGROUND

In a configuration mode of a power transmission system used in conventional fracturing equipment on fracturing sites in oil and gas fields all over the world, a diesel engine is connected to a transmission to drive a fracturing plunger pump through a transmission shaft to work. This configuration mode has the following disadvantages: (1) Large volume and heavy weight: When the diesel engine drives the transmission to drive the fracturing plunger pump through the transmission shaft, a large volume is occupied, a heavy weight is involved, the transportation is restricted, and the power density is low. (2). Environmental problems: During operations on a well site, the fracturing equipment driven by the diesel engine would generate engine waste gas pollution and noise pollution. The noise exceeding 105 dBA will severely affect the normal life of nearby residents. (3). Cost inefficiency: The fracturing equipment driven by the diesel engine requires relatively high initial purchase costs and incurs high fuel consumption costs for unit power during operation, and the engine and the transmission also require very high routine maintenance costs. Efforts are made globally to manufacture oil-gas exploitation equipment with "low energy consumption, low noise, and low emission". Therefore, the foregoing disadvantages of conventional fracturing equipment that uses the diesel engine as the power source impedes the exploitation progress of unconventional oil and gas sources to some extent.

It is a good solution for replacement of conventional diesel engine driven equipment with electric drive equipment. However, high-voltage generators are employed in conventional power supply schemes by generators, i.e., rectifier transformers need to be used to supply power to the rectifying units, while the rectifier transformers are too bulky, expensive, and involve complex wiring. The above features of the rectifier transformers themselves, to some extent, result in the power supply part in the electric drive equipment are bulky, i.e., occupy a large area, expensive, and involve complex wiring, thus greatly limiting the widely use of the electric drive equipment.

Therefore, a power supply semi-trailer for electric drive fracturing equipment is urgently needed that is small in size, low in cost, and simple in wiring.

SUMMARY

To overcome the deficiencies in the prior art, an objective of the present invention is to provide a power supply semi-trailer for electric drive fracturing equipment, including a combination of a gas turbine engine, a generator and a rectifying unit, the generator is connected to the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure, occupies a small area, and is simple in wiring.

The objective of the present invention is achieved by the following technical measures: a power supply semi-trailer for electric drive fracturing equipment, including a power supply semi-trailer body, one gas turbine engine, one generator, multiple sets of rectifying units and multiple sets of inversion units, wherein the gas turbine engine, the generator and the rectifying units are integrated on the power supply semi-trailer body; one end of the generator is connected to the gas turbine engine, the other end of the generator is connected to the rectifying units, the multiple sets of rectifying units are arranged side by side; the inversion units are disposed on a gooseneck of the electric drive semi-trailer body, and the rectifying units are connected to the inversion units through a common DC bus.

Further, the generator is a double-winding generator.

Further, the generator is connected to the rectifying units directly.

Further, a phase difference of double winding of the generator is 30°, and the winding configuration is type Y-Y or type D-D.

Further, the power of the generator is at least 10 MVA, and the frequency is 50-60 Hz or 100-120 Hz.

Further, the voltages of the rectifying units range from 4000 VDC to 6500 VDC.

Further, each of the inversion units includes two three-level inverters.

Further, the inversion units disposed on another gooseneck of the semi-trailer are high voltage inversion units.

Compared with the prior art, the beneficial effects of the present invention are as follows:

1. Employing a combination of a gas turbine engine, a generator and rectifying units, the generator is connected to the rectifying units directly to obviate conventional rectifier transformer equipment.

2. The rectifying units are connected to the inversion units through a common DC bus, so that the common DC bus can separately drive multiple inversion units, thus decreasing the wirings of power supply lines.

3. A high voltage inversion unit is disposed on a gooseneck of the electric drive semi-trailer to optimize the spatial arrangement of equipment.

4. The entire power supply equipment has a compact structure, occupies a small area, and is simple in wiring.

5. The output power of the entire power supply equipment is high, providing a forceful guarantee for the high-power electric drive fracturing equipment.

The present invention will be described in detail below with reference to the accompanying drawings and specific implementations.

Wherein, 1. power supply semi-trailer body, 2. gas turbine engine, 3. generator, 4. rectifying unit, 5. high voltage inversion unit, 6. electric drive fracturing equipment, 7. gooseneck, 8. electric drive semi-trailer body, 9. double-winding generator, 10. three-level inverter, 11. common DC bus, and 12. plunger pump.

DESCRIPTION OF THE EMBODIMENTS

Figure 1:
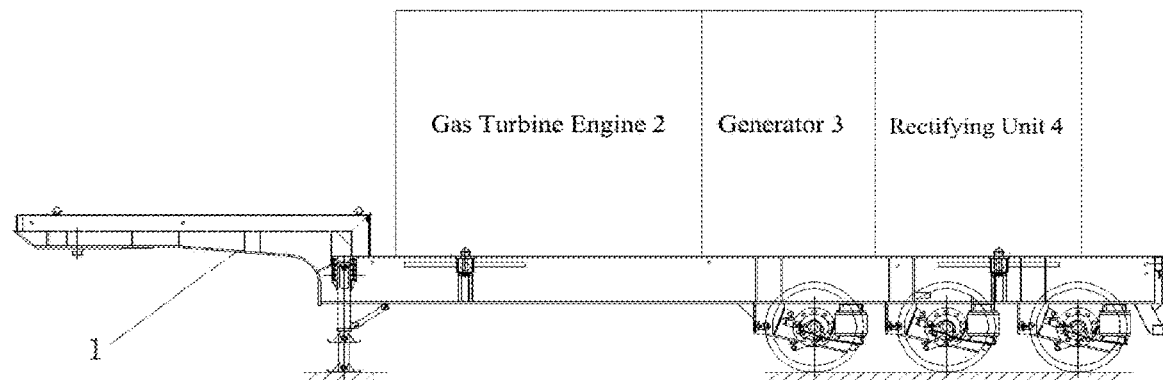
FIG. 1 is a schematic structural diagram of a power supply semi-trailer.
Figure 2:
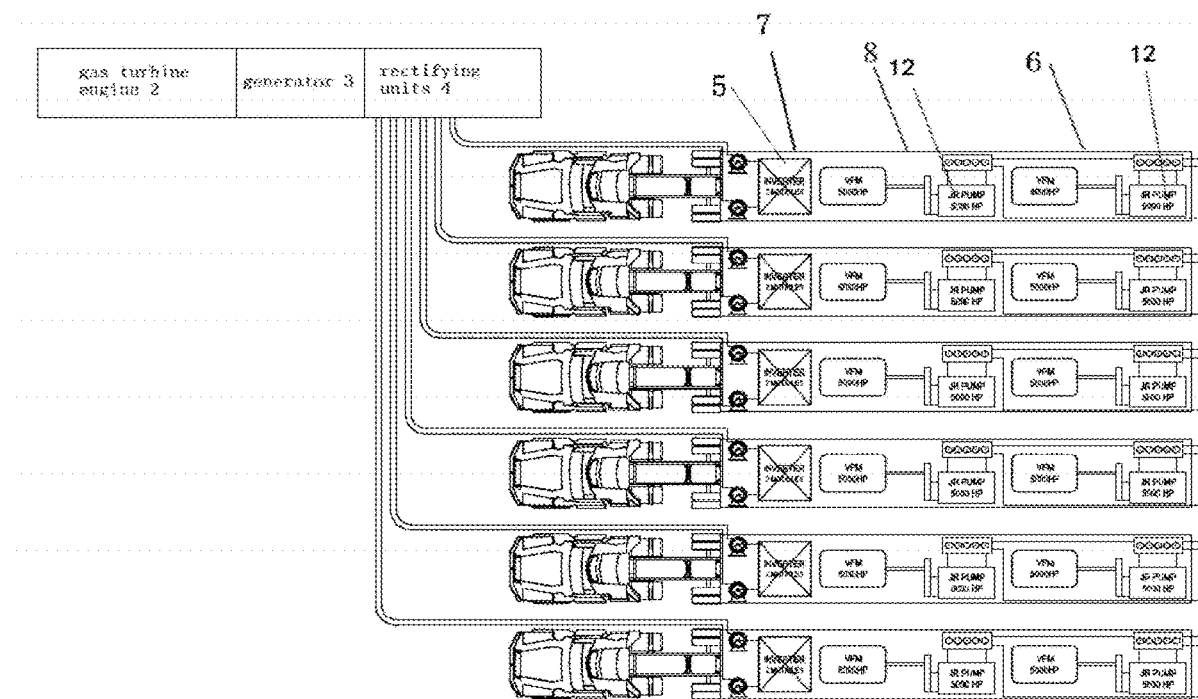
FIG. 2 is a schematic structural diagram of an electric drive fracturing equipment.
Figure 3:
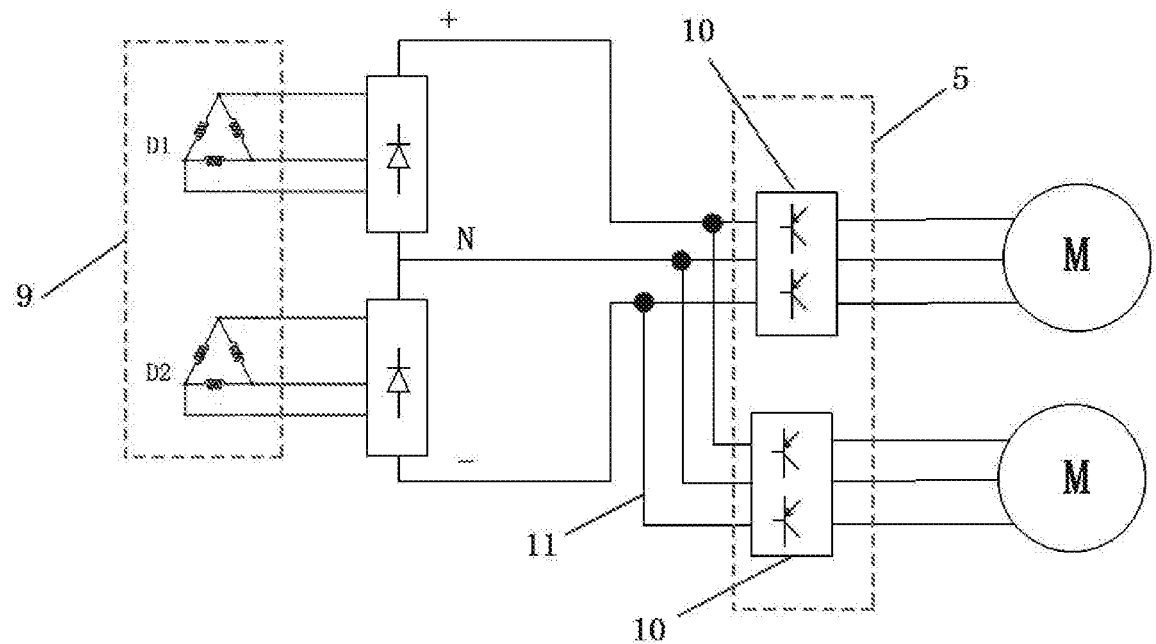
FIG. 3 is a schematic diagram of electrical connection of a generator in D-D configuration.
Figure 4:
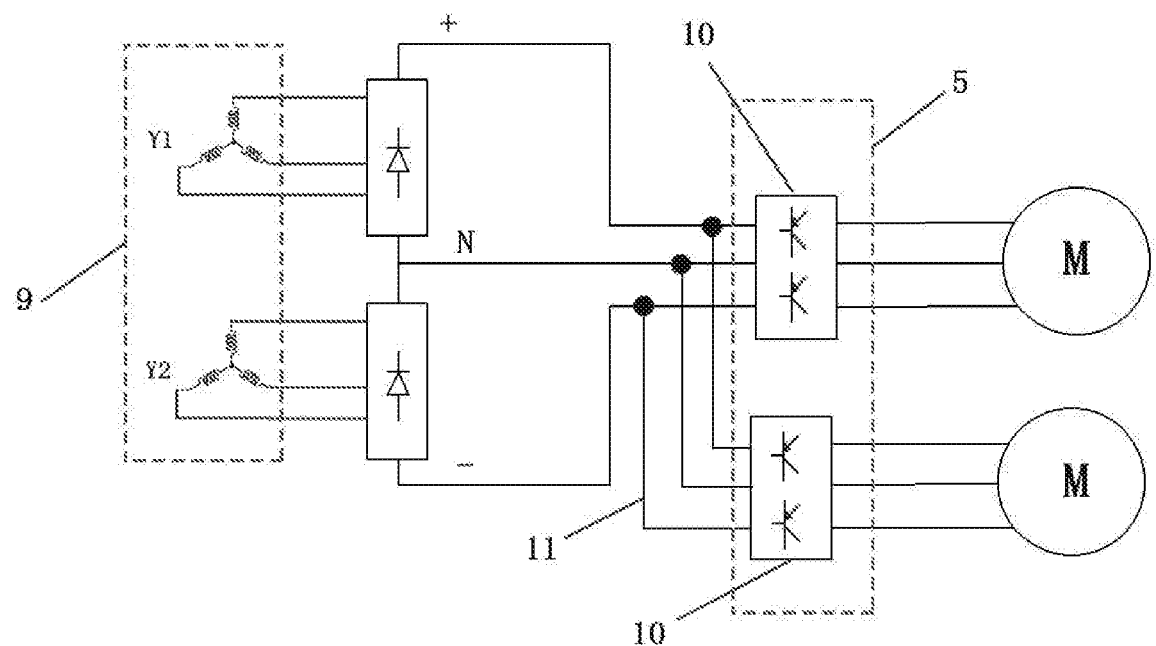
FIG. 4 is a schematic diagram of electrical connection of a generator in Y-Y configuration.

As shown in FIGS. 1 to 2, an embodiment provides a power supply semi-trailer for electric drive fracturing equipment, including a power supply semi-trailer body 1, one gas turbine engine 2, one generator 3, multiple sets of rectifying units 4 and multiple sets of inversion units, wherein the gas turbine engine 2, the generator 3 and the rectifying units 4 are integrated on the power supply semi-trailer body 1; one end of the generator 3 is connected to the gas turbine engine 2, the other end of the generator 3 is connected to the rectifying units 4, the multiple sets of rectifying units 4 are arranged side by side; the inversion units are disposed on a gooseneck of the electric drive semi-trailer body, and the rectifying units 4 are connected to the inversion units through a common DC bus. The generator 3 is a double-winding generator. The generator 3 is connected to the rectifying units 4 directly. The power supply semi-trailer is a power supply semi-trailer matched with the electric drive fracturing equipment, which is provided with a combination of a gas turbine engine 2, a generator 3 and a rectifying unit 4 integrated on a power supply semi-trailer body 1. The generator 3 is connected to the rectifying unit 4 directly. This power supply mode directly obviate the rectifier transformer equipment in conventional power supply, making the volume of the power supply semi-trailer smaller. The rectifying units 4 are connected to the inversion units through a common DC bus, so that the common DC bus can separately drive multiple inversion units, thus decreasing the wirings of power supply lines, and simplifying the circuit connection, the wiring becoming more easier.

The inversion units disposed on a gooseneck of the electric drive semi-trailer body are high voltage inversion units 5. The high voltage inversion units 5 are disposed on a gooseneck of the electric drive semi-trailer body to optimize the spatial arrangement of equipment, so that the entire electric drive fracturing equipment has a compact structure, and occupies a small area.

The phase difference of double winding of the generator 3 is 30°, the winding configuration is type Y-Y or type D-D. The alternating voltage output from the generator 3 ranges from 1600 VAC to 2300 VAC.

The power of the generator 3 is at least 10 MVA, the frequency is 50-60 Hz or 100-120 Hz, and the voltages of the rectifying units 4 are 4000 VDC or above, and further the voltages of the rectifying units range from 4000 VDC to 6500 VDC, ensuring that the power supply semi-trailer has a high output power to drive a high-power electric drive fracturing semi-trailer.

As shown in FIG. 2, it is a schematic diagram of connection between the power supply semi-trailer and the high-power electric drive fracturing semi-trailer. The rectifying units 4 on the power supply semi-trailer body 1 are connected to the inversion units disposed on the gooseneck of the electric drive semi-trailer body through a common DC bus. Each of the inversion units has a compartment structure provided with two three-level inverters. Each inverter can drive one electric motor to work independently. Electric motors are used to drive the plunger pump to work, providing a forceful guarantee for the power supply of the high-power electric drive equipment. The lubricating oil radiator is used to cool the lubricating oil in the plunger pump. An electrical control cabinet is used to implement local manipulation of the electric drive fracturing semi-trailer.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A power supply semi-trailer for electric drive fracturing equipment, comprising:
   a power supply semi-trailer body,
   a gas turbine engine,
   a generator, and
   a plurality of rectifying units,
   wherein the gas turbine engine and the generator are arranged on the power supply semi-trailer body,
   a first end of the generator is connected to the gas turbine engine and a second end of the generator is connected to the rectifying units, and
   the generator is configured to output a voltage to the rectifying units directly without passing through a rectifier transformer.

2. The power supply semi-trailer of claim 1, wherein the generator is a double-winding generator.

3. The power supply semi-trailer of claim 2, wherein the double-winding generator has a phase difference of 30° and a winding configuration of type Y-Y or type D-D.

4. The power supply semi-trailer of claim 1, wherein the generator has a power of at least 10 MVA, and a frequency of 50-60 Hz or 100-120 Hz.

5. The power supply semi-trailer of claim 1, wherein the rectifying units have voltages ranging from 4000 VDC to 6500 VDC.

6. The power supply semi-trailer of claim 1, wherein the plurality of rectifying units comprise a plurality of sets of rectifying units arranged side by side.

7. An electric drive fracturing equipment, comprising:
   the power supply semi-trailer of claim 6 and a plurality of sets of inversion units,
   wherein the rectifying units are connected to the inversion units through common DC buses.

8. The electric drive fracturing equipment of claim 7, further comprising a plurality of sets of fracturing semi-trailers comprising a plurality of fracturing semi-trailer bodies respectively,
   wherein the plurality of sets of inversion units are on the fracturing semi-trailer bodies respectively.

9. The electric drive fracturing equipment of claim 8, wherein each set of the inversion units comprises two inverters, and the inverters are three-level inverters.

10. The electric drive fracturing equipment of claim 8, wherein the inversion units are high voltage inversion units, and each of the plurality of sets of the inversion units is arranged on a gooseneck of one of sets of the fracturing semi-trailers.

11. The electric drive fracturing equipment of claim 8, further comprising an electric motor and a plunger on each of the fracturing semi-trailer bodies,
   wherein each of the inversion units is connected to the electric motor and the electric motor is connected to a plunger pump.

12. A fracturing method, comprising:
   providing a power supply semi-trailer body,
   providing a gas turbine engine,
   providing a generator, and
   providing a plurality of rectifying units,
   wherein the gas turbine and the generator are arranged on the power supply semi-trailer body,
   a first end of the generator is connected to the gas turbine engine and a second end of the generator is connected to the rectifying units, and
   the generator is configured to output a voltage to the rectifying units directly without passing through a rectifier transformer.

13. The fracturing method of claim 12, wherein the generator is a double-winding generator.

14. The fracturing method of claim 13, wherein the double-winding generator has a phase difference of 30° and a winding configuration of type Y-Y or type D-D.

15. The fracturing method of claim 12, wherein the generator has a power of at least 10 MVA, and a frequency of 50-60 Hz or 100-120 Hz.

16. The fracturing method of claim 12, wherein the rectifying units have voltages ranging from 4000 VDC to 6500 VDC.

17. The fracturing method of claim 12, wherein the plurality of rectifying units comprise a plurality of sets of rectifying units arranged side by side.

18. The fracturing method of claim 12, further comprising:
   providing a plurality of sets of fracturing semi-trailers, comprising a plurality of fracturing semi-trailer bodies respectively,
   providing a plurality of sets of inversion units on the plurality of fracturing semi-trailer bodies respectively,
   wherein each set of the inversion units comprises two inverters, the inverters are three-level inverters, and the rectifying units are connected to the inversion units through common DC buses.

19. The fracturing method of claim 18, wherein the inversion units are high voltage inversion units, and each of the plurality of sets of the inversion units is arranged on a gooseneck of one of sets of the fracturing semi-trailers.

20. The fracturing method of claim 18, further comprising an electric motor and a plunger on each of the fracturing semi-trailer bodies,
   wherein each of the inversion units is connected to the electric motor and the electric motor is connected to a plunger pump.

\* \* \* \* \*